United States Patent
Li et al.

(10) Patent No.: US 11,769,306 B2
(45) Date of Patent: Sep. 26, 2023

(54) USER-EXHIBIT DISTANCE BASED COLLABORATIVE INTERACTION METHOD AND SYSTEM FOR AUGMENTED REALITY MUSEUM

(71) Applicant: ZHEJIANG UNIVERSITY, Hangzhou (CN)

(72) Inventors: Xiangdong Li, Hangzhou (CN); Yue Wu, Hangzhou (CN); Kailin Yin, Hangzhou (CN); Yifei Shan, Hangzhou (CN); Simon Perrault, Singapore (SG)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/636,017

(22) PCT Filed: Nov. 15, 2019

(86) PCT No.: PCT/CN2019/118992
§ 371 (c)(1),
(2) Date: Feb. 16, 2022

(87) PCT Pub. No.: WO2021/068356
PCT Pub. Date: Apr. 15, 2021

(65) Prior Publication Data
US 2022/0277525 A1    Sep. 1, 2022

(30) Foreign Application Priority Data
Oct. 10, 2019   (CN) .......................... 201910958721.6

(51) Int. Cl.
*G06T 19/00* (2011.01)
*G06V 20/20* (2022.01)
(Continued)

(52) U.S. Cl.
CPC ............ *G06T 19/006* (2013.01); *G06F 3/011* (2013.01); *G06V 20/20* (2022.01); *G06V 20/635* (2022.01); *G06T 2219/024* (2013.01)

(58) Field of Classification Search
CPC . G06T 19/006; G06T 2219/024; G06F 3/011; G06F 3/016; G06F 3/017;
(Continued)

(56) References Cited

U.S. PATENT DOCUMENTS 9,985,999 B1 * 5/2018 Simon ................ H04L 65/1093
10,339,718 B1 * 7/2019 Kamal ................ H04N 9/3194
(Continued)

FOREIGN PATENT DOCUMENTS

CN   201580009875.0   11/2016
CN   201610801442.5   1/2017
(Continued)

OTHER PUBLICATIONS

Zalulis et al., Exploration of large-scale museum artifacts through non-instrumented, location-based, multi-user interaction, Eurographics Digital Library, pp. 155-162 (Year: 2010).*
(Continued)

*Primary Examiner* — Motilewa Good-Johnson
(74) *Attorney, Agent, or Firm* — Jiwen Chen; Joywin IP Law PLLC

(57) ABSTRACT

The present invention discloses a user-exhibit distance based collaborative interaction method and system for an augmented reality museum. The method includes: detecting and acquiring dynamic position information of a user, and calculating a sensing distance of the user in real time according to the dynamic position information of the user; establishing a distance model with an exhibit as a center according to the sensing distance, and setting interaction authority of the user according to the distance model and a real-time sensing
(Continued)

distance of the user; dynamically matching a single-user interaction mode and a multi-user collaborative interaction mode within the interaction authority of the user to the user according to the interaction authority of the user corresponding to the sensing distance of the user; executing, by the user, a single-user interaction behavior and a multi-user collaborative interaction behavior in real time according to the single-user interaction mode and the multi-user collaborative interaction mode; and realizing recommendation of the exhibit between users according to a real-time single-user interaction behavior result and a real-time multi-user collaborative interaction behavior result. The method and system promote the user to have a real-time and interesting interaction with other surrounding users while learning about museum exhibits progressively.

9 Claims, 3 Drawing Sheets

(51) Int. Cl.
*G06V 20/62* (2022.01)
*G06F 3/01* (2006.01)

(58) Field of Classification Search
CPC ..... G06F 3/0346; G06F 3/0484; G06V 20/20; G06V 20/635; G06Q 50/10
See application file for complete search history.

(56) References Cited

U.S. PATENT DOCUMENTS

| | | | |
|---|---|---|---|
| 10,591,987 B2* | 3/2020 | Pan | G06T 3/20 |
| 10,795,449 B2* | 10/2020 | Faaborg | G06F 3/013 |
| 10,937,247 B1* | 3/2021 | Chuah | G06T 7/70 |
| 11,024,079 B1* | 6/2021 | Chuah | G06T 7/246 |
| 11,040,276 B2* | 6/2021 | Fuchs | G06F 3/012 |
| 11,044,393 B1* | 6/2021 | Suiter | H04N 23/63 |
| 11,232,644 B1* | 1/2022 | Lee | G06F 3/011 |
| 11,416,080 B2* | 8/2022 | Heo | G06F 3/04842 |
| 2007/0162942 A1* | 7/2007 | Hamynen | G06F 3/147 348/E7.071 |
| 2014/0201666 A1* | 7/2014 | Bedikian | G06F 3/04815 715/771 |
| 2014/0354602 A1* | 12/2014 | He | G06F 3/017 345/175 |
| 2015/0035750 A1* | 2/2015 | Bailey | G06F 3/0482 345/158 |
| 2015/0193979 A1* | 7/2015 | Grek | G06F 1/1694 345/633 |
| 2016/0029014 A1* | 1/2016 | Kim | G06F 3/017 345/214 |
| 2016/0180602 A1* | 6/2016 | Fuchs | A63F 13/211 463/31 |
| 2016/0188585 A1 | 6/2016 | Durham et al. | |
| 2017/0124763 A1* | 5/2017 | De Pasquale | G09B 5/125 |
| 2018/0095524 A1* | 4/2018 | Chew | G06F 3/038 |
| 2018/0253163 A1* | 9/2018 | Berger, Jr. | G06F 3/0383 |
| 2018/0285065 A1* | 10/2018 | Jeong | G06F 3/167 |
| 2019/0051051 A1* | 2/2019 | Kaufman | G09B 9/06 |
| 2019/0164266 A1* | 5/2019 | Kuo | G06T 3/40 |
| 2019/0197785 A1* | 6/2019 | Tate-Gans | G06T 19/006 |
| 2019/0304406 A1* | 10/2019 | Griswold | G06T 19/00 |
| 2019/0362557 A1* | 11/2019 | Lacey | G06T 7/70 |
| 2020/0066054 A1* | 2/2020 | Yin | G06F 1/163 |
| 2020/0074740 A1* | 3/2020 | Singh | G06T 19/006 |
| 2020/0090365 A1* | 3/2020 | Hu | G06F 3/0304 |
| 2020/0133618 A1* | 4/2020 | Kim | G06F 3/147 |
| 2020/0137815 A1* | 4/2020 | Wang | H04L 65/40 |
| 2020/0322754 A1* | 10/2020 | Soule | G06Q 30/0236 |
| 2021/0173340 A1* | 6/2021 | Kim | G03H 1/2249 |
| 2021/0312887 A1* | 10/2021 | Griswold | G06F 3/0346 |
| 2022/0011931 A1* | 1/2022 | Feng | G06F 3/04847 |
| 2023/0023346 A1* | 1/2023 | Dal Zotto | H04N 23/611 |
| 2023/0023609 A1* | 1/2023 | Winold | G06T 13/40 |

FOREIGN PATENT DOCUMENTS

| | | |
|---|---|---|
| CN | 106648322 | 5/2017 |
| CN | 107547359 | 1/2018 |
| CN | 107688573 | 2/2018 |
| CN | 108173736 | 6/2018 |
| CN | 201810251806.6 | 9/2018 |
| CN | 201810873062.1 | 12/2018 |
| CN | 2019101742054 | 3/2019 |
| CN | 109597942 | 4/2019 |
| CN | 109885778 | 6/2019 |

OTHER PUBLICATIONS

Li et al., Distance-driven user interface for collaborative exhibit viewing in Augmented reality museum, UIST '19 Adjunct: Adjunct Proceedings of the 32nd Annual ACM Symposium on User Interface Software and Technology, Oct. 2019 pp. 42-43 (Year: 2019).*

* cited by examiner

USER-EXHIBIT DISTANCE BASED COLLABORATIVE INTERACTION METHOD AND SYSTEM FOR AUGMENTED REALITY MUSEUM

This is a U.S. national stage application of PCT Application No. PCT/CN2019/118992 under 35 U.S.C. 371, filed Nov. 15, 2019 in Chinese, claiming priority to Chinese Patent Applications No. 201910958721.6, filed Oct. 10, 2019, all of which are hereby incorporated by reference.

FIELD OF TECHNOLOGY

The present invention relates to the technical field of augmented reality and multi-user collaborative interaction, and in particular to a user-exhibit distance based collaborative interaction method for an augmented reality museum, and a collaborative interaction system, achieving the method, for an augmented reality museum.

BACKGROUND

An increasing number of museums are trying to display their exhibits through various emerging technologies to attract more visitors. The emerging technologies, such as virtual reality (VR), live broadcasts, three dimensional (3D) printing and mobile phone client development, gradually promote publics' awareness of digital museums, virtual museums, smart museums, mobile museums, etc. The augmented reality (AR) technology can show exhibit information in diversified forms and realize interaction between a user and an exhibit. An existing AR museum focuses on seamless fusion of a virtual image into a real scene, thus showing a restoring model of a cultural relic and a user experience that gives life to an exhibit, enhancing the interaction between an exhibit and a user, and improving fun of visiting museums.

A museum is a study place suitable for people of all ages. However, when one visits the museum, rote memorization of relevant knowledge is usually the most inefficient, whereas observation and thinking are more important to stimulate interest and inspiration. Discussion and communication between users are beneficial to stimulation of attention and interest of the users in an exhibit. For example, putting forward one's own thoughts and feelings when viewing an exhibit is helpful to deepen users' absorption of exhibit-related knowledge. But a learning environment provided by the existing AR museum only can realize the interaction between the users and objects without information interaction and knowledge sharing between the users. The most primitive interaction between people was neglected while attention was paid to a learning experience of exhibits for the users, which failed to maximize information dissemination, but was limited to the users' self-learning in different degrees. Important discussion and communication links in a learning process were discarded, thus failing to make full use of the museum as the learning environment to meet communication needs between the users.

Existing AR devices, including well-developed Hololens, low-cost and simple devices such as Holokit, mobile phones, etc., can meet a collaborative interaction requirement to a certain extent, but existing AR applications do not focus on collaborative interaction in museum scenes. For instance, patent applications CN201810873062.1 and CN201810251806.6 focus on a display method of guide and digital contents in an AR museum scene, only discussing interaction between a user and an exhibit and between a user and a scene instead of interaction between users. The patent application CN201910174205.4 provides an AR method and system for multi-user interaction, which realize the multi-user interaction. The application can only display a virtual object but cannot realize information transmission and communication between people. The patent applications CN201580009875.0 and CN201610801442.5 provide a collaborative interaction method and system supporting AR. But in the method and system, collaboration is in a remote environment, and a remote collaboration mode is fixed. The collaboration in a museum belongs to collaboration in the same physical environment, and forms of collaboration between users are diverse and constantly changing.

SUMMARY OF THE INVENTION

The object of the present invention is to provide a user-exhibit distance based collaborative interaction method for an augmented reality museum, and a collaborative interaction system for an augmented reality museum which achieves the method, thus solving problems of low learning efficiency and a poor experience caused by isolation of users in an existing augmented reality (AR) museum scene, and promoting the users to have real-time and interesting interaction with other surrounding users while learning about an exhibit of a museum progressively.

To achieve the above objects, a technical solution of the present invention is as follows:

In one aspect, a user-exhibit distance based collaborative interaction method for an augmented reality museum comprises:

detecting and acquiring dynamic position information of a user, where the dynamic position information comprises a physical distance between the user and an exhibit, an orientation towards the exhibit and a moving speed, and calculating a sensing distance of the user in real time according to the physical distance, the orientation towards the exhibit and the moving speed;

establishing a distance model with the exhibit as a center according to the sensing distance, and setting interaction authority of the user according to the distance model and a real-time sensing distance of the user;

dynamically matching a single-user interaction mode and a multi-user collaborative interaction mode within the interaction authority of the user to the user according to the interaction authority of the user corresponding to the sensing distance of the user;

executing, by the user, a single-user interaction behavior and a multi-user collaborative interaction behavior in real time according to the single-user interaction mode and the multi-user collaborative interaction mode; and realizing recommendation of the exhibit between users according to a real-time single-user interaction behavior result and a real-time multi-user collaborative interaction behavior result.

In another aspect, a user-exhibit distance based collaborative interaction system for an augmented reality museum comprises:

a data detection module configured for detecting and acquiring dynamic position information of a user, where the dynamic position information comprises a physical distance between the user and an exhibit, an orientation towards the exhibit and a moving speed;

a cloud database module configured for storing the detected dynamic position information of the user, exhibit information, a virtual model of the exhibit, interaction behavior result data and a distance model;

a data processing module configured for extracting a key word label of the exhibit from a name, a profile and a category of the exhibit, establishing a label data set corresponding to the exhibit, and dynamically matching a single-user interaction mode and a multi-user collaborative interaction mode within interaction authority of the user to the user according to the detected dynamic position information of the user;

a display device module configured for displaying the dynamically matched single-user interaction mode and multi-user collaborative interaction mode within the interaction authority of the user and displaying an interaction result at the same time; and an input device module, as an interaction medium, configured for collecting interaction operations input by the user to realize an interaction behavior.

Compared with the prior art, the present invention has the beneficial effects:

In the collaborative interaction system and method for an augmented reality museum, according to a distance between the user and the exhibit, which corresponds to the interaction authority within an open distance range, the user interacts cooperatively with other surrounding users while interacting with the exhibit in the museum progressively, thus increasing interactive interest of the user and improving learning efficiency and an interactive somatosensory effect.

BRIEF DESCRIPTION OF THE DRAWINGS

In order to more clearly describe a technical solution in the embodiments of the present invention or in the prior art, a brief introduction to the accompanying drawings required for the description of the embodiments or the prior art will be provided below. Obviously, the accompanying drawings in the following description are merely some embodiments of the present invention. Those of ordinary skill in the art would also derive other accompanying drawings from these accompanying drawings without making inventive efforts.

DETAILED DESCRIPTION OF THE EMBODIMENTS

For making the objects, technical solutions and advantages of the present invention clearer, the present invention will be described in further detail below in conjunction with the accompanying drawings and embodiments. It should be understood that the specific embodiments described herein are merely illustrative of the present invention and are not intended to limit the protection scope of the present invention.

In order to solve problems of low learning efficiency and a poor experience caused by isolation of users in an existing augmented reality (AR) museum scene, and promote the users to have real-time and interesting interaction with other surrounding users while learning about museum exhibits progressively, the embodiments provide a user-exhibit distance based collaborative interaction method for an augmented reality museum, and further provide a collaborative interaction system for an augmented reality museum which achieves the method.

Figure 1:
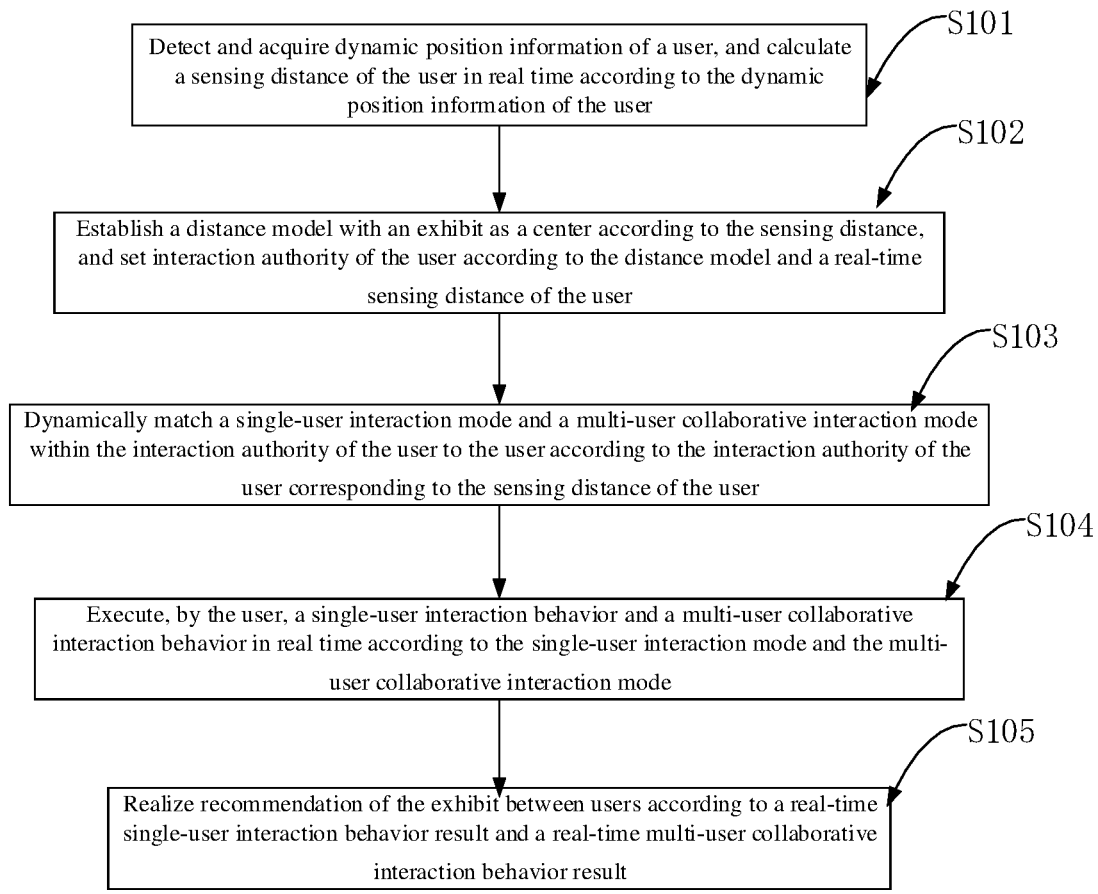
FIG. 1 is a flow diagram of user-exhibit distance based collaborative interaction for an augmented reality museum of the present invention.

As shown in FIG. 1, a user-exhibit distance based collaborative interaction method for an augmented reality museum provided in the embodiment comprises the following steps that S101, detecting and acquiring dynamic position information of a user, and calculating a sensing distance of the user in real time according to the dynamic position information of the user.

Division of a distance model is based on a sense about an exhibit of the user, so a physical distance between the user and the exhibit cannot be directly used to calculate the sensing distance between the user and the exhibit. A height, a moving state, a face orientation and other factors of the user may all influence determination of the distance by the user, so the present invention detects a plurality of parameter data to calculate the sensing distance of the user. The sensing distance between the user and the exhibit is calculated by detecting the dynamic position information of the user such as the physical distance between the user and the exhibit, the orientation towards the exhibit and a moving speed.

A method for acquiring the physical distance between the user and the exhibit, the orientation towards the exhibit and the moving speed comprises the following steps that an augmented reality device identifying a plane where the exhibit is located, and then calculating a straight-line distance between a camera of the augmented reality device and a center point of the plane to serve as the physical distance between the user and the exhibit when the user views the exhibit;

calculating an inclination angle of the augmented reality device to serve as the orientation towards the exhibit according to data of a gravity sensor and an angular speed sensor in the augmented reality device; and a gyroscope in the augmented reality device calculating displacement of the user within 1 second in an orientation towards the exhibit to serve as the moving speed.

On the basis of obtaining the dynamic position information of the user such as the physical distance between the user and the exhibit, the orientation towards the exhibit and the moving speed, the sensing distance may be obtained. Therefore, the step that the sensing distance of the user is calculated in real time according to the physical distance, the orientation towards the exhibit and the moving speed comprises the following step that calculating the sensing distance of the user according to the following formula:

$$Dp = (1 + \sin\theta) \times (Dp' + L - d_0)$$

where $Dp$ is the sensing distance, $\theta$ is an orientation angle with respect to the exhibit, $Dp'$ is the physical distance between the user and the exhibit, $d_0$ is the moving speed, and $L$ is a thickness or an error value of the augmented reality device.

Figure 2:
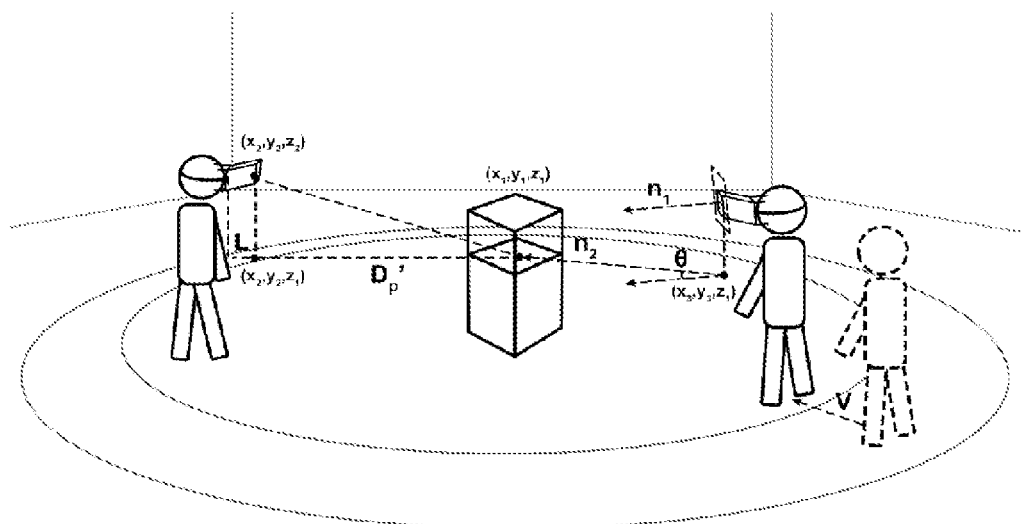
FIG. 2 is a schematic diagram of a calculation description of a sensing distance of the present invention.

Calculation of the sensing distance from a product is described below in conjunction with FIG. 2. Firstly, the user identifies the exhibit to start data detection, when a plane of an exhibition stand is detected, a central anchor point position is selected as a position of the exhibit, which is denoted as $(x_1, y_1, z_1)$, the user is positioned as $(x_2, y_2, z_2)$ by means of a global position system (GPS) positioning module on the augmented reality device (which may be a head-mounted or handheld AR device), and then a plane distance Dp' between the user and the exhibit and a space vector n2 may be obtained. The augmented reality device has a certain thickness, so a certain error value L is added. A plane where the augmented reality device is located is obtained by means of the gravity sensor and the angular speed sensor in the augmented reality device, which is a current face orientation of the user. A normal vector n1 of the plane may be calculated. A deviation angle θ of the user is calculated according to the normal vector n1 and the space vector n2. A current speed v of the user is obtained by means of the internal gyroscope and an acceleration sensor. The displacement within 1 second in the orientation towards the exhibit is d0. The sensing distance of the user may be obtained according to the parameters and $Dp=(1+\sin \theta) \times (Dp'+L-d_0)$.

All the parameters may be detected by a wireless sensor. The wireless sensor may be fixed to the AR device. The error value of the sensing distance is adjusted according to a sensor fixing position. In the present invention, an own sensor of a mobile phone is preferably used for data detection and collection. Generally, a smart phone is equipped with the sensors. An ARCore development library is preferably used for identifying the plane of the exhibition stand.

S102, the distance model with the exhibit as a center is established according to the sensing distance, and interaction authority of the user is set according to the distance model and a real-time sensing distance of the user.

The distance model divides an area around the exhibit into a plurality of areas according to the sensing distance between the user and the exhibit. Each area corresponds to unique interaction authority to limit an interaction behavior of the user. Specifically, the step that the distance model with the exhibit as the center is established according to the sensing distance comprises the following step that according to sensory ability levels of the user, dividing the sensing distance between the user and the exhibit into four sensing distance ranges, where distance ranges formed by projecting the four sensing distance ranges onto a bottom face divide a circular area with the exhibit as the center into four circular rings, and with the exhibit as the center, the circular rings are sequentially an operation area, an observation area, a passerby area and an environment area from near to far, so as to form the distance model.

The present invention is capable of realizing interaction between the user and the exhibit and between users, thus improving interaction fun and learning efficiency. Therefore, the interaction authority of the user comprises a single-user interaction mode and a multi-user collaborative interaction mode.

Specifically, the interaction authority of the user comprises the single-user interaction mode, and specifically comprises the following steps that for the operation area, providing all label pages displaying the exhibit and a virtual avatar of the exhibit for the user, personalized texture and color painting are provided for the virtual avatar, and functions of giving a like, scoring and virtual hand-drawing are provided for the exhibit or pages;

for the observation area, providing all the label pages displaying the exhibit for the user, functions of giving a like, scoring and virtual hand-drawing are provided for the exhibit or pages, a painting selection interface is provided, and prompt information is output according to received painting request information of the user, so as to prompt the user to approach the exhibit for more interesting operations;

for the passerby area, providing a detailed page displaying a key word of a label and a public label of a product for the user, a private label selection interface is provided, prompt information is output according to received private label request information of the user, so as to prompt the user to approach the exhibit to view more detailed contents, a function of giving a like to the exhibit is provided, a scoring and virtual hand-drawing selection interface is provided, the prompt information is output according to a received scoring and virtual hand-drawing request of the user, so as to prompt the user to approach the exhibit, and the painting selection interface is provided without receiving the painting request information from the user; and for the environment area, providing a marker of the exhibit in a range of visibility for the user.

Specifically, the interaction authority of the user further comprises the multi-user collaborative interaction mode, and specifically comprises the following steps that sharing the single-user interaction behavior within the interaction authority of the user corresponding to a same area with a user in the same area, and words and animations are output to represent the prompt information to synchronously allow other users belonging to the same area to know some on-going interaction behavior and present an interaction behavior process; and sharing an interaction behavior of a user in an area close to the exhibit with a user in an area far away from the exhibit.

The interaction authority is described below in conjunction with FIG. 3. In the embodiment, according to sensible features of the exhibit, a spatial distance between the user and the exhibit is divided into four distance ranges, and with the exhibit as the center, the distance ranges are sequentially an operation area D1, an observation area D2, a passerby area D3 and an environment area D4 from near to far, which correspond to user-exhibit distances required when the exhibit can be operated, observed and identified and cannot be identified respectively.

Except for the environment area where the user cannot establish an interactive relationship with the exhibit, the other three areas correspond to different interaction authority of the user. The user may view more detailed information pages of the exhibit while getting closer to the center of the exhibit and moreover may perform more types of interaction operations. With the center of the exhibition stand as an original point, specific concepts and values are set as follows:

The operation area D1: 0-0.8 m, which is an area range where an object is capable of being operated by the user at close range. A distance between the area and the exhibit meets a requirement of observing and operating the exhibit at close range. The area range generally ranges from an arm length to half a human height. The range meets a private spatial distance requirement and is suitable for an immersion browsing operation of the user. In the operation area D1, the user may view all the label pages of the exhibit and the virtual avatar of the exhibit, may provide the personalized texture and the color painting for the virtual avatar, and may give a like to and score the exhibit or pages and write a virtual hand-drawing review.

The observation area D2: 0.8-2.4 m, and in the range, the user is capable of further observing appearance and details of the object. The area range is generally a human height and meets a social distance requirement. In the observation area D2, the user may view all the label pages of the exhibit, and may give a like to and score the exhibit or pages and write the virtual hand-drawing review. When clicking a painting button, the user may be prompted to approach the exhibit for more interesting operations.

The passerby area D3: 2.4-4.0 m, and the user may identify the object when passing the passerby area D3. In the passerby area D3, the user may only view the detailed page displaying the key word of the label and the public label of the exhibit. When clicking a private label, the user may be prompted to approach the exhibit to view more detailed contents. The user may give a like to the exhibit. When clicking a scoring and virtual hand-drawing button, the user may be prompted to get close to the exhibit, and meanwhile the painting button may be not displayed.

The environment area D4: a distance >4.0 m, which is an area range where the user cannot associate with the object, that is, the whole range excluding the passerby area. The area range belongs to a public area. In the area range, the user cannot identify the exhibit and cannot interact with other users. But in the area range, the user may still see a marker of the exhibit in a range of visibility. A size of the marker represents popularity of the exhibit.

Figure 3:
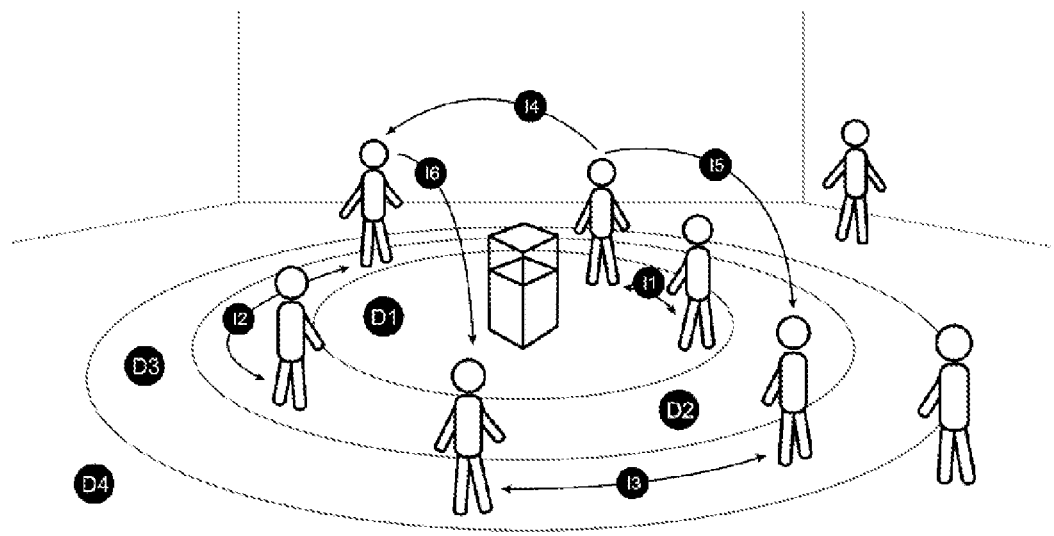
FIG. 3 is a schematic diagram of a distance model based multi-user collaborative interaction scene with a plurality of modes in parallel of the present invention.

In FIG. 3, I1, I2 and I3 indicate that users in the same area share interaction behaviors within a corresponding authority range of the area, where the interaction behaviors include viewing pages, giving a like, scoring, writing a review, painting, and synchronously prompting the user to know that surrounding users are executing some interaction behavior by means of word and animation prompt information.

Regarding I1, a plurality of users in the operation area D1 simultaneously perform the painting operation, operation processes of the plurality of users are displayed synchronously, after painting is completed, painting results may be uploaded to a cloud, and then the users share asynchronous data.

Regarding I2, when the plurality of users in observation area D2 write a review, perform scoring or perform other operations at the same time, corresponding buttons in other user interfaces may be triggered, and other users may be prompted to know that surrounding users are executing the operation, and encouraged to try the operation.

Regarding I3, when the plurality of users in passerby area D3 give a like, view labels or perform other operations at the same time, corresponding buttons or labels in other user interfaces may be triggered, and other users may be prompted to know that surrounding users are executing the operation.

I4, I5 and I6 indicate interaction behaviors of a user in an area close to the exhibit, which are unidirectionally shared with a user in an area far away from the exhibit by means the prompt information. I4 indicates that an interaction operation of the user in the operation area D1 is shared with the user in the observation area D2, I5 indicates that the interaction operation of the user in the operation area D1 is shared with the user in the passerby area D3, and I6 indicates that an interaction operation of the user in the observation area D2 is shared with the user in the passerby area D3.

It should be noted that the present invention is not limited to the collaborative interaction mode, but may divide the authority of the user according to functions included in an actual augmented reality application, so as to realize collaboration between users at different distances.

S103, a single-user interaction mode and a multi-user collaborative interaction mode within the interaction authority of the user are dynamically matched to the user according to the interaction authority of the user corresponding to the sensing distance of the user.

Figure 4:
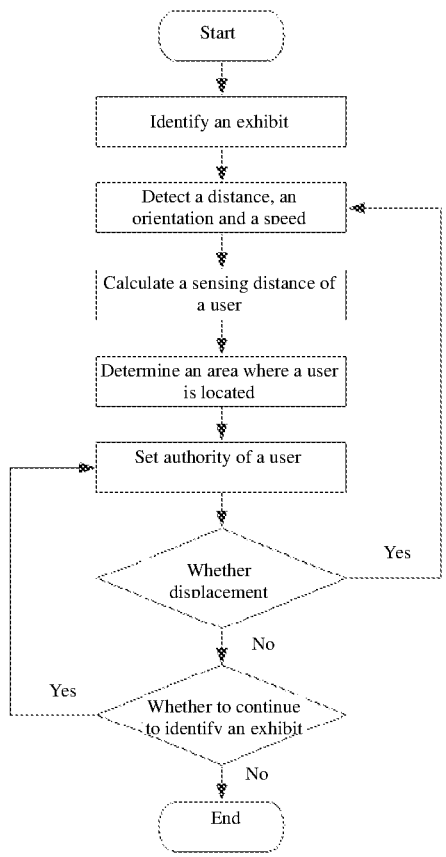
FIG. 4 is a flow diagram of setting of interaction authority in a real-time interaction process of a user of the present invention.

On the basis of obtaining the distance model and the interaction authority corresponding to the model, in a real-time interaction process, the sensing distance may be calculated according to the dynamic position information, collected in real time, of the user, and the interaction authority may be dynamically updated according to the sensing distance on the basis of the distance model until the end of interaction. A specific process is as shown in FIG. 4, and a setting process of the interaction authority of the user comprises the following steps:

The user identifies the exhibit to start to detect the physical distance, the orientation towards the exhibit and the moving speed and calculates the sensing distance of the user, then a range where the distance model is located is determined, corresponding authority of the user is set, and a user interface is updated in real time. When a GPS module and the acceleration sensor detect movement of the user, whether a device continues identifying the exhibit is determined, and then a parameter is detected again and calculation is performed if the device continues identifying the exhibit. When the user does not identify a current exhibit any more, a current task is stopped.

After the user obtains the interaction authority of the user corresponding to the real-time sensing distance of the user, the single-user interaction mode and the multi-user collaborative interaction mode within the current interaction authority of the user are matched and opened to the user.

S104, the user executes a single-user interaction behavior and a multi-user collaborative interaction behavior in real time according to the single-user interaction mode and the multi-user collaborative interaction mode.

The user executes a corresponding interaction behavior according to the single-user interaction mode and the multi-user collaborative interaction mode within the authority range, that is, the current user may execute the single-user interaction mode within the interaction authority, comprising viewing all the label pages of the exhibit and the virtual avatar of the exhibit, providing the personalized texture and the color painting for the virtual avatar, and giving a like to and scoring the exhibit or pages and writing a virtual hand-drawing review, may further execute the multi-user collaborative interaction mode comprising prompting of the interaction behavior between the users and sharing of interaction results.

S105, recommendation of a product between users is realized according to a real-time single-user interaction behavior result and a real-time multi-user collaborative interaction behavior result.

After the interaction behavior results are obtained, the interaction behavior results also need to store. The collaborative interaction method for an augmented reality museum further comprises the following steps:

the interaction behavior results are stored, specifically, painting results and scoring results are stored, so as to allow a plurality of users to share the drawing results and the scoring results.

While the interaction behavior results are stored, the interaction behavior results are further recommended to other users according to the multi-user collaborative interaction mode.

In the collaborative interaction method for an augmented reality museum, according to a distance between the user and the exhibit, which corresponds to the interaction authority within an open distance range, the user interacts cooperatively with other surrounding users while interacting with the exhibit in the museum progressively, thus increasing interactive interest of the user and improving learning efficiency and an interactive somatosensory effect.

Figure 5:
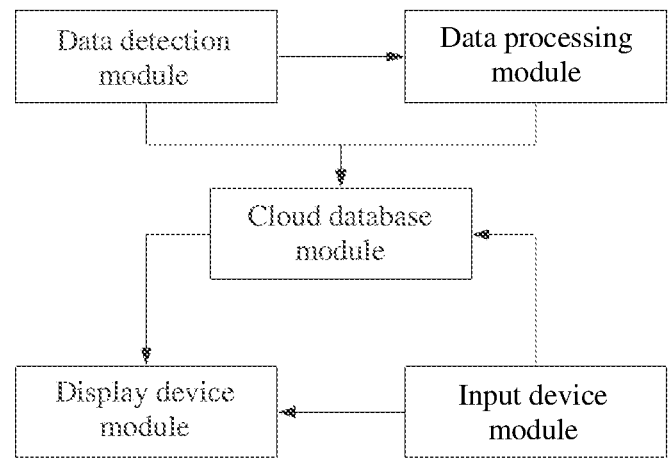
FIG. 5 is a structural schematic diagram of a user-exhibit distance based collaborative interaction system for an augmented reality museum of the present invention.

As shown in FIG. 5, the embodiment further provides a user-exhibit distance based collaborative interaction system for an augmented reality museum, which achieves the user-exhibit distance based collaborative interaction method for an augmented reality museum. The system comprises:

a data detection module configured for detecting and acquiring dynamic position information of a user, where the dynamic position information comprises a physical distance between the user and an exhibit, an orientation towards the exhibit and a moving speed;

a cloud database module configured for storing the detected dynamic position information of the user, exhibit information, a virtual model of the exhibit, interaction behavior result data and a distance model;

a data processing module configured for extracting a key word label of the exhibit from a name, a profile and a category of the exhibit, establishing a label data set corresponding to the exhibit, and dynamically matching a single-user interaction mode and a multi-user collaborative interaction mode within interaction authority of the user to the user according to the detected dynamic position information of the user;

a display device module configured for displaying the dynamically matched single-user interaction mode and multi-user collaborative interaction mode within the interaction authority of the user and displaying an interaction result at the same time; and an input device module, as an interaction medium, configured for collecting interaction operations input by the user to realize an interaction behavior.

Specifically, the data detection module is mainly configured for collecting the dynamic position information such as the physical distance between the user and the exhibit, the orientation towards the exhibit and the moving speed, and specifically comprises a wireless sensor. The wireless sensor is fixed to a wearable AR device and configured for detecting dynamic behavior data of the user for later data processing. A component module of the wireless sensor is encapsulated in a shell. During working, the wireless sensor is powered by a battery or vibration generator to form wireless sensor network nodes. Randomly distributed micro nodes integrated with sensor, data processing units and communication modules form a network in a self-organizing mode. A digital signal of a device may be collected and transmitted to a wireless gateway of a monitoring center by means of a wireless sensor network, and then sent directly to a computer for analysis and processing. The wireless sensor may further transmit a collected whole time history signal in real time as required. The monitoring center may further wirelessly transmit information such as control and parameter setting to nodes by means of a gateway. A data conditioning, collecting and processing module sends a weak signal output by the sensor to an analog-digital converter after the weak signal passes through amplification, filtering and other conditioning circuits, converts the weak signal into a digital signal, and sends the weak signal to a main processor for digital signal processing to calculate an effective value, a displacement value, etc. of the sensor. In the present invention, an own sensor of a mobile phone is preferably used for data detection. Generally, a smart phone is equipped with a required sensor.

The cloud database module contains a cloud database which is deployed and virtualized in a cloud computing environment. Cloud database is a novel method for sharing infrastructure developed under the background of cloud computing, which greatly enhances storage capacity of a database and makes it easier to upgrade software and hardware. The cloud database has the characteristics of high scalability, high availability, multi-tenancy and effective distribution of resources.

Figure 6:
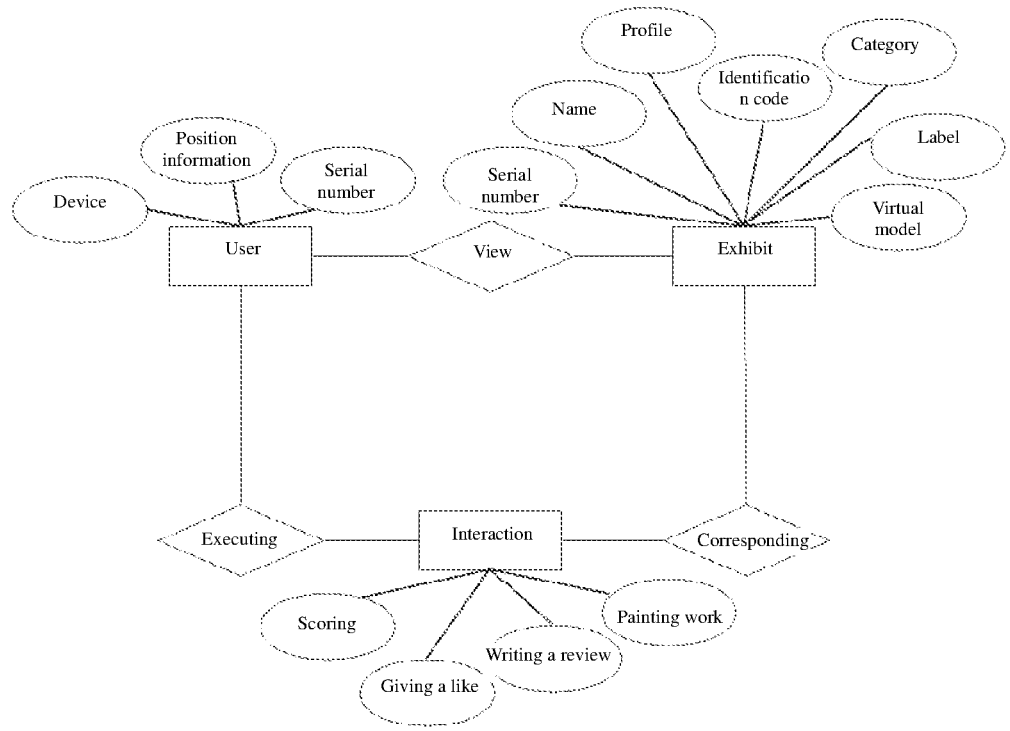
FIG. 6 is an entity relationship diagram of a cloud database of the present invention.

Specifically, as shown in FIG. 6, the cloud database module comprises:

an exhibit information unit configured for storing a serial number, a name, a profile, an identifier and a category of the exhibit and store an established label data system;

an exhibit virtual model unit, where each exhibit establishes a corresponding virtual model, comprising two forms of a texture map and a non-texture map;

a user dynamic position unit configured for recording the position information of the user from the time when the user identifies the exhibit to the time when the user no longer identifies the exhibit; and a user interaction result data unit comprising scores and a like amount of the user for the exhibit as well as uploaded reviews and painting works.

The distance model in the cloud database may be established through the interaction method, and the interaction authority of the user corresponding to the distance model is also consistent with that in the interaction method, which will not be repeated herein.

As a computing center of the whole collaborative interaction system for an augmented reality museum, the data processing module mainly realizes establishment of the label data set, calculation of the sensing distance and setting and matching of the interaction authority of the user. Specifically, the data processing module comprises:

a label data set creating submodule configured for extracting the key word label of the exhibit from the name, the profile and the category of the exhibit, and establishing the label data set corresponding to the exhibit, where key word extraction is an important part in the field of text mining. There are three modes to extract key words from text: supervision, semi-supervision and non-supervision. A text key word extraction algorithm with supervision requires high labor cost. The present invention preferably uses non-supervision key word extraction with strong applicability.

On the basis of an existing museum database, the key word label is extracted from the name, the category and the profile of the exhibit, and then an exhibit information database is supplemented and improved. The labels include a public label and a private label. The public label relates to various categories of attribute information, while the private label relates to unique background information of the exhibit. Taking the "Qianlong imperial famille rose nine peach vase" in Qing Dynasty as an example, a public label of the vase comprises information such as an age (Qing Dynasty), a shape (a globular shape vase), and a craft (a famille-rose porcelain), while the private label comprises a pattern (Nine Peach), a meaning ("Traditional Five Bat Patterns and Longevous Pattern") and a unique story and auction information of the vase, etc.

A sensing distance calculation module is configured for calculating a sensing distance of the user in real time according to the dynamic position information of the user comprising the physical distance, the orientation towards the exhibit and the moving speed.

A user interaction authority setting and matching module is configured for setting the interaction authority of the user according to the distance model and a real-time sensing distance of the user, and further dynamically matching and outputting the single-user interaction mode and the multi-user collaborative interaction mode within the interaction authority of the user to the user according to the interaction authority of the user corresponding to the sensing distance of the user.

A calculation process of the sensing distance of a calculation method of the sensing distance in the sensing distance calculation module is consistent with that of the interaction method, which will not be repeated herein.

Similarly, the steps of setting the interaction authority of the user and dynamically matching and outputting the single-user interaction mode and the multi-user collaborative interaction mode within the interaction authority of the user to the user according to the set interaction authority of the user corresponding to the sensing distance of the user in the user interaction authority setting and matching module are consistent with the S102 and S103 in the interaction method, which will not be repeated herein.

Regarding a display device, the present invention designs a strap on the basis of an original handheld device, so that the display device is capable of being fixed to a head. It should be noted that the present invention does not have high demand for the display device, including but not limited to Hololens, Holokit, a mobile device, etc., so long as a corresponding sensor and a corresponding input device are rationally configured, an effect may be achieved.

Regarding an input device, the present invention preferably uses a one-hand Bluetooth interactive handle, which is capable of being connected with the mobile phone, and the interaction operation may be performed with one hand. When the prompt information appears, the handle may vibrate to prompt the user to pay attention to the operation. In addition, another mobile phone may be used as the input device, and technologies such as voice identification and gesture identification may be selected for interaction.

The collaborative interaction system for an augmented reality museum shares the interaction behavior of the user in the area close to the exhibit in real time by means of the prompt information, so as to stimulate interest of the users in the area far away from the exhibit in the exhibit, promote the uses in the area far away from the exhibit to approach the exhibit, and obtain more viewing and interaction authority.

The technical solutions and the beneficial effects of the present invention are described in detail in the specific embodiments described above. It should be understood that the above are only preferred embodiments of the present invention and are not intended to limit the present invention. Any modifications, supplementation, equivalent substitutions, etc. within the principle range of the present invention are intended to be included within the protection scope of the present invention.

What is claimed is:

1. A user-exhibit distance based collaborative interaction method for an augmented reality museum, comprising:
   detecting and acquiring dynamic position information of a user, wherein the dynamic position information comprises a physical distance between the user and an exhibit, an orientation towards the exhibit and a moving speed, and calculating a sensing distance of the user in real time according to the physical distance, the orientation towards the exhibit and the moving speed;
   establishing a distance model with the exhibit as a center according to the sensing distance, and setting interaction authority of the user according to the distance model and a real-time sensing distance of the user;
   dynamically matching a single-user interaction mode and a multi-user collaborative interaction mode within the interaction authority of the user to the user according to the interaction authority of the user corresponding to the sensing distance of the user;
   executing, by the user, a single-user interaction behavior and a multi-user collaborative interaction behavior in real time according to the single-user interaction mode and the multi-user collaborative interaction mode; and
   realizing recommendation of the exhibit between users according to a real-time single-user interaction behavior result and a real-time multi-user collaborative interaction behavior result;
   wherein a method for acquiring the physical distance between the user and the exhibit, the orientation towards the exhibit and the moving speed comprises:
   identifying, by an augmented reality device, a plane where the exhibit is located, and then calculating a straight-line distance between a camera of the augmented reality device and a center point of the plane to serve as the physical distance between the user and the exhibit when the user views the exhibit;
   calculating an inclination angle of the augmented reality device to serve as the orientation towards the exhibit according to data of a gravity sensor and an angular speed sensor in the augmented reality device; and
   calculating, by a gyroscope in the augmented reality device, displacement of the user within 1 second in an orientation towards the exhibit to serve as the moving speed.

2. The user-exhibit distance based collaborative interaction method for an augmented reality museum according to claim 1, wherein the calculating a sensing distance of the user in real time according to the physical distance, the orientation towards the exhibit and the moving speed comprises:
   calculating the sensing distance of the user according to the following formula:

$$Dp=(1+\sin\theta)\times(Dp'+L-d_0)$$

wherein Dp is the sensing distance, $\theta$ is an orientation angle with respect to the exhibit, Dp' is the physical distance between the user and the exhibit, $d_0$ is the moving speed, and L is a thickness or an error value of the augmented reality device.

3. The user-exhibit distance based collaborative interaction method for an augmented reality museum according to claim 1, wherein the establishing a distance model with the exhibit as a center according to the sensing distance comprises:
   dividing, according to sensory ability levels of the user, the sensing distance between the user and the exhibit into four sensing distance ranges, wherein distance ranges formed by projecting the four sensing distance ranges onto a bottom face divide a circular area with the exhibit as the center into four circular rings, and with the exhibit as the center, the circular rings are sequentially an operation area, an observation area, a passerby area and an environment area from near to far, so as to form the distance model.

4. The user-exhibit distance based collaborative interaction method for an augmented reality museum according to claim 3, wherein the interaction authority of the user comprises the single-user interaction mode, and specifically comprises:
   for the operation area, providing all label pages displaying the exhibit and a virtual avatar of the exhibit for the user, providing personalized texture and color painting for the virtual avatar, and providing functions of giving a like, scoring and virtual hand-drawing for the exhibit or pages;

for the observation area, providing all the label pages displaying the exhibit for the user, providing functions of giving a like, scoring and virtual hand-drawing for the exhibit or pages, providing a painting selection interface, and outputting prompt information according to received painting request information of the user, so as to prompt the user to approach the exhibit for more interesting operations;

for the passerby area, providing a detailed page displaying a key word of a label and a public label of a product for the user, providing a private label selection interface, outputting prompt information according to received private label request information of the user, so as to prompt the user to approach the exhibit to view more detailed contents, providing a function of giving a like to the exhibit, providing a scoring and virtual hand-drawing selection interface, outputting the prompt information according to a received scoring and virtual hand-drawing request of the user, so as to prompt the user to approach the exhibit, and providing the painting selection interface without receiving the painting request information from the user; and for the environment area, providing a marker of the exhibit in a range of visibility for the user.

5. The user-exhibit distance based collaborative interaction method for an augmented reality museum according to claim 4, wherein the interaction authority of the user further comprises the multi-user collaborative interaction mode, and specifically comprises:

sharing the single-user interaction behavior within the interaction authority of the user corresponding to a same area with a user in the same area, and outputting words and animations to represent the prompt information to synchronously allow other users belonging to the same area to know some on-going interaction behavior and present an interaction behavior process; and sharing an interaction behavior of a user in an area close to the exhibit with a user in an area far away from the exhibit.

6. The user-exhibit distance based collaborative interaction method for an augmented reality museum according to claim 3, wherein the interaction authority of the user further comprises the multi-user collaborative interaction mode, and specifically comprises:

sharing the single-user interaction behavior within the interaction authority of the user corresponding to a same area with a user in the same area, and outputting words and animations to represent the prompt information to synchronously allow other users belonging to the same area to know some on-going interaction behavior and present an interaction behavior process; and sharing an interaction behavior of a user in an area close to the exhibit with a user in an area far away from the exhibit.

7. The user-exhibit distance based collaborative interaction method for an augmented reality museum according to claim 1, further comprising:

storing the interaction behavior results, which includes storing painting results and scoring results, so as to allow a plurality of users to share drawing results and scoring results.

8. A user-exhibit distance based collaborative interaction system for an augmented reality museum, comprising:

a data detection module configured for detecting and acquiring dynamic position information of a user, wherein the dynamic position information comprises a physical distance between the user and an exhibit, an orientation towards the exhibit and a moving speed;

a cloud database module configured for storing the detected dynamic position information of the user, exhibit information, a virtual model of the exhibit, interaction behavior result data and a distance model;

a data processing module configured for extracting a key word label of the exhibit from a name, a profile and a category of the exhibit, establishing a label data set corresponding to the exhibit, and dynamically matching a single-user interaction mode and a multi-user collaborative interaction mode within interaction authority of the user to the user according to the detected dynamic position information of the user;

a display device module configured for displaying the dynamically matched single-user interaction mode and multi-user collaborative interaction mode within the interaction authority of the user and displaying an interaction result at the same time; and an input device module, as an interaction medium, configured for collecting interaction operations input by the user to realize an interaction behavior.

9. The user-exhibit distance based collaborative interaction system for an augmented reality museum according to claim 8, wherein the data processing module comprises:

a label data set creating submodule configured for extracting the key word label of the exhibit from the name, the profile and the category of the exhibit, and establishing the label data set corresponding to the exhibit;

a sensing distance calculation module configured for calculating a sensing distance of the user in real time according to the dynamic position information of the user comprising the physical distance, the orientation towards the exhibit and the moving speed; and a user interaction authority setting and matching module configured for setting the interaction authority of the user according to the distance model and a real-time sensing distance of the user, and further dynamically matching and outputting the single-user interaction mode and the multi-user collaborative interaction mode within the interaction authority of the user to the user according to the interaction authority of the user corresponding to the sensing distance of the user.

* * * * *